Nov. 29, 1966 R. E. KOSTUR 3,287,877
LOADING FIXTURE FOR SKIN-PACKAGING MACHINE
Filed Oct. 1, 1963 4 Sheets-Sheet 1
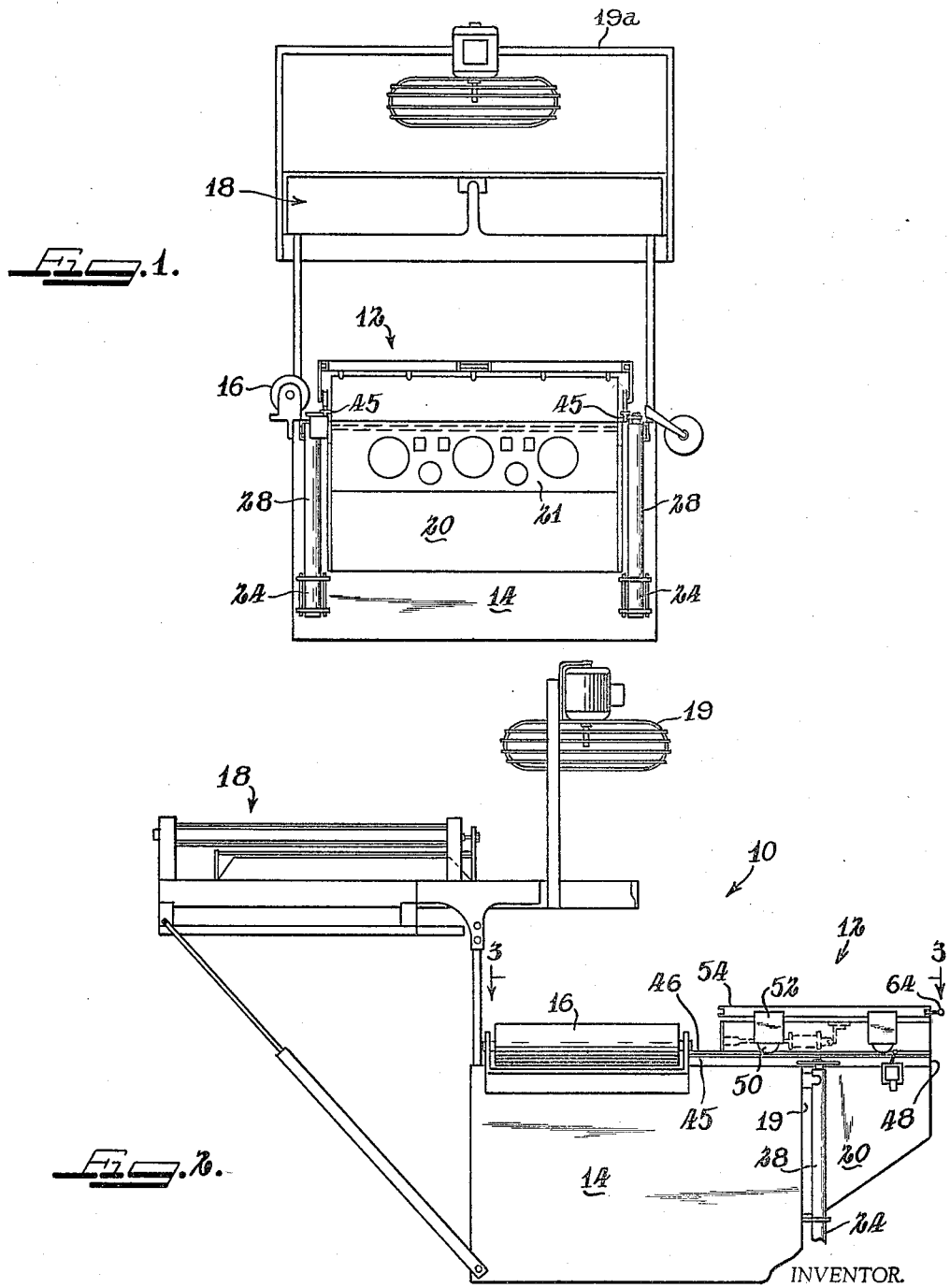
INVENTOR.
ROBERT E. KOSTUR
BY Fidler, Bradley,
Patnaude & Batchelder
Attys.

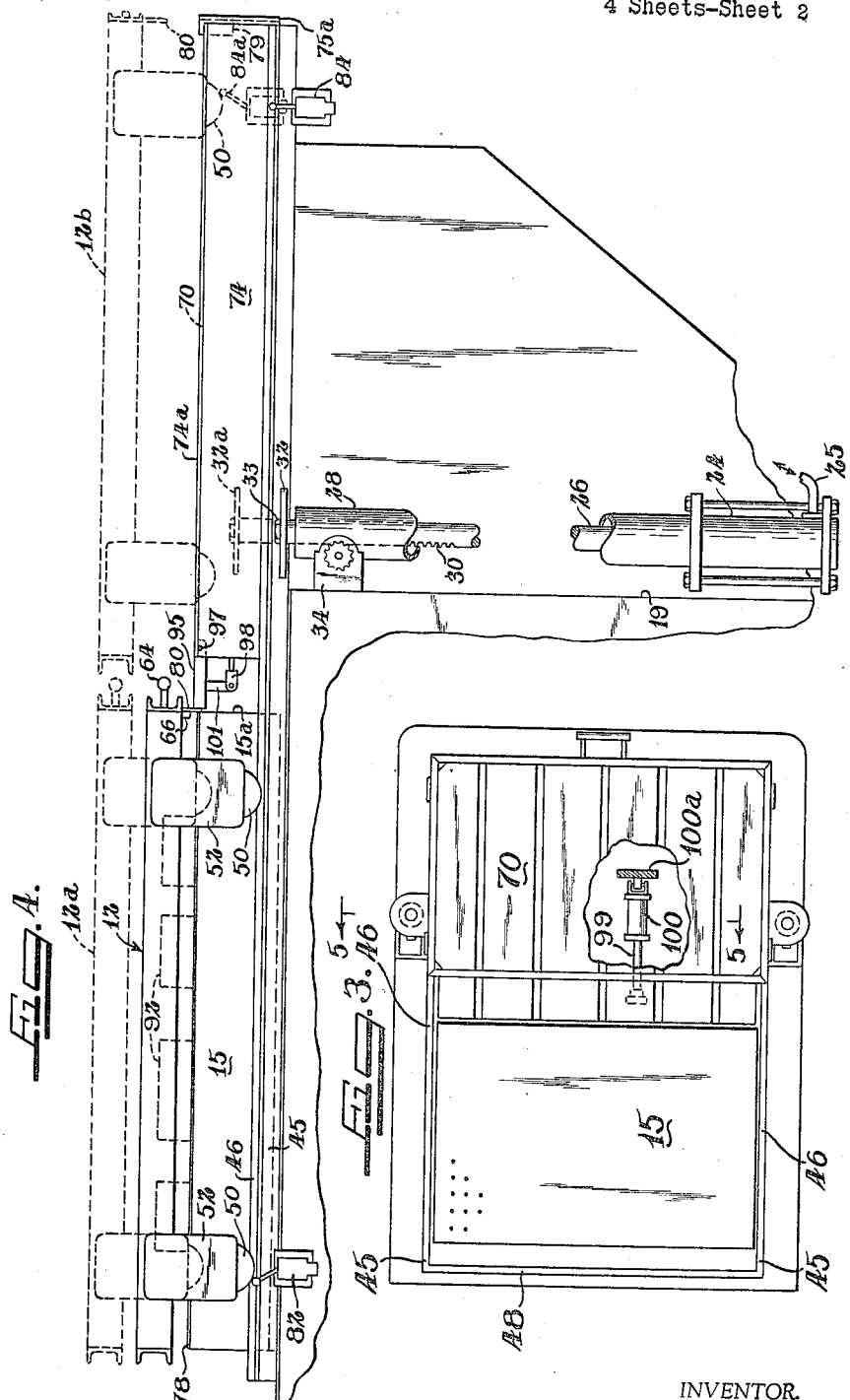

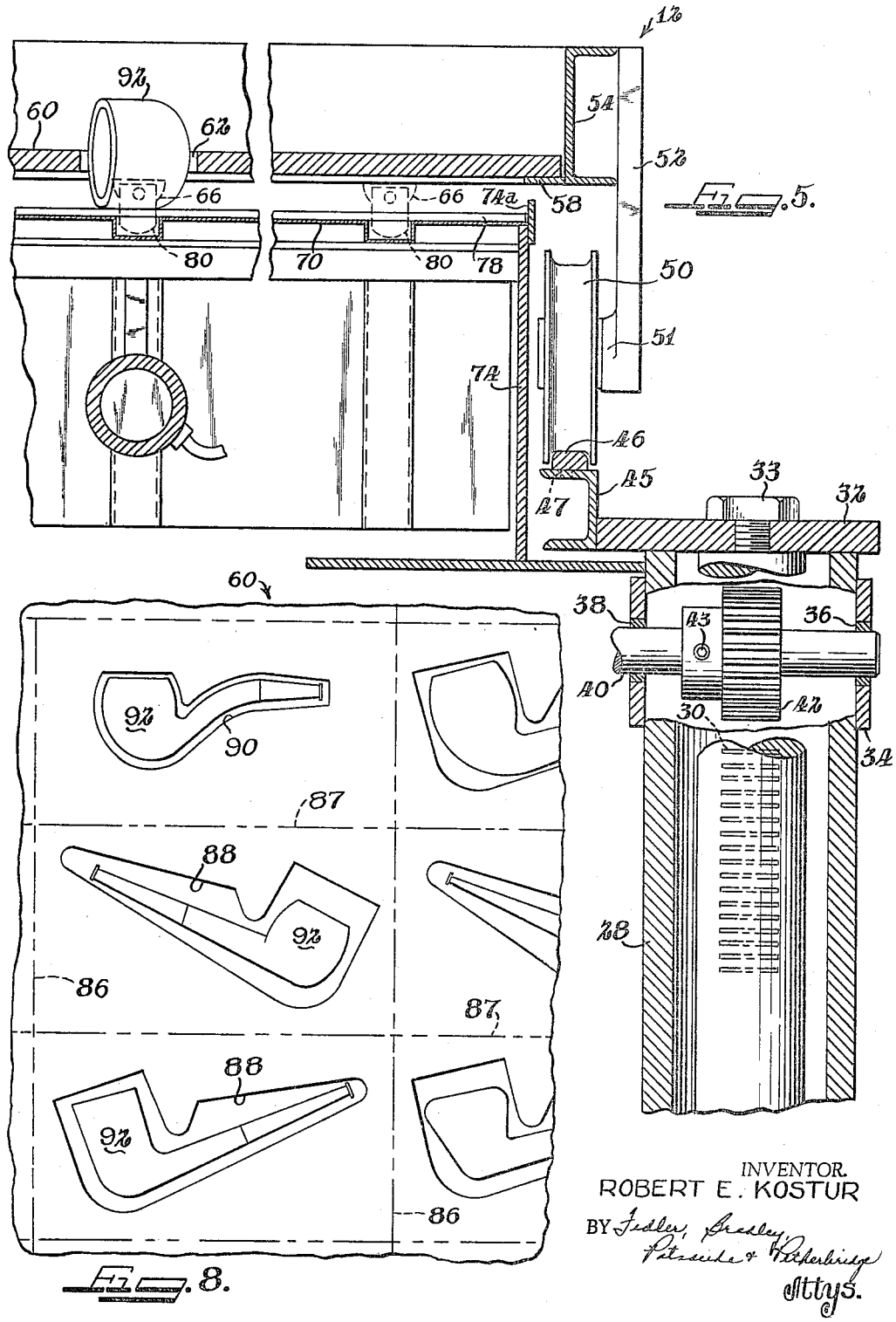

Nov. 29, 1966  R. E. KOSTUR  3,287,877
LOADING FIXTURE FOR SKIN-PACKAGING MACHINE
Filed Oct. 1, 1963  4 Sheets-Sheet 4
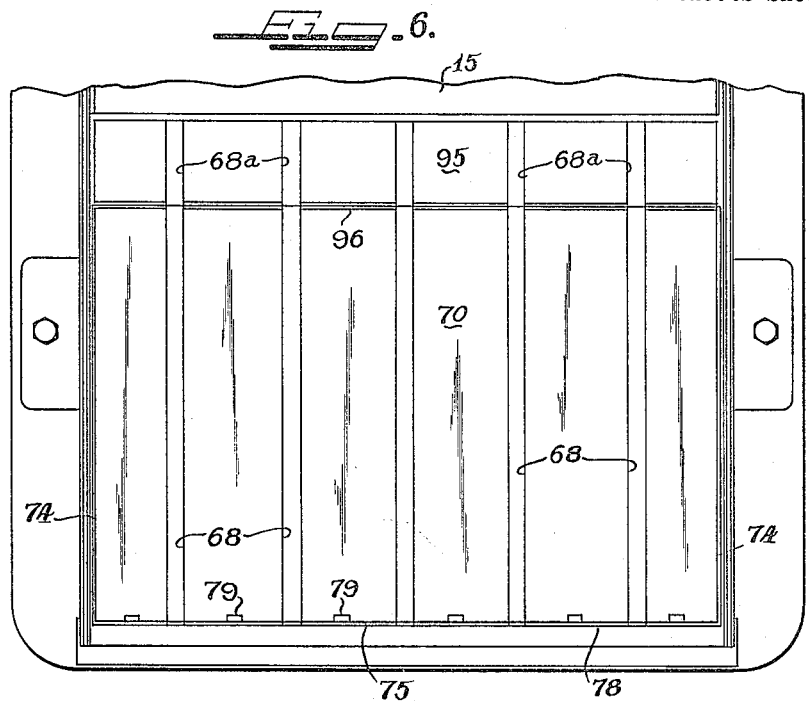
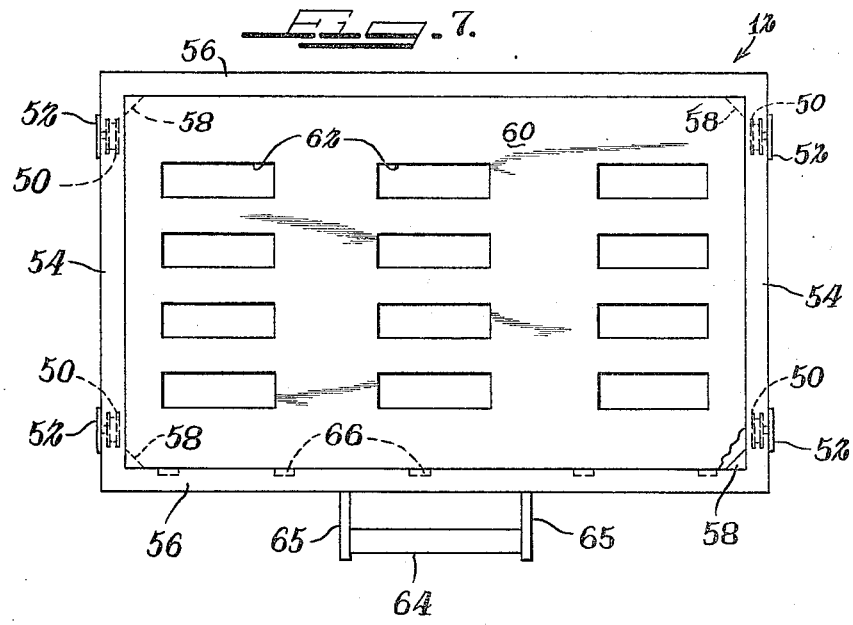
INVENTOR.
ROBERT E. KOSTUR
BY Fidler, Bradley,
Patnaude & Fickenberg
Attys.

United States Patent Office 3,287,877
Patented Nov. 29, 1966

1

3,287,877
LOADING FIXTURE FOR SKIN-PACKAGING
MACHINE
Robert E. Kostur, Franklin Park, Ill., assignor to Comet Industries, Inc., Franklin Park, Ill., a corporation of Illinois
Filed Oct. 1, 1963, Ser. No. 313,089
21 Claims. (Cl. 53—112)

The present invention relates to improvements in skin-packaging machines; and more particularly to a loading fixture for loading and skin-packaging articles in such machines.

This invention is characterized by providing a template and jig device together with a carriage movable in and out of loading and skin-packaging positions. The device can include several jigs, each jig being provided with surfaces for laterally inhibiting movements of articles placed therein in a predetermined pattern by arrangement of the inhibiting surfaces. The surfaces further are formed so that articles can be placed in the jig and be moved thereby through a predetermined portion of a path of travel into the machine. Within the machine the jig is moved upwardly and the articles pass relatively down through the jig and remain in repose on a flat bottom sheet of packaging material. The jig is moved out of the machine and an automatic or semi-automatic series of steps of skin-packaging the articles are performed by the machine.

Skin-packaging machine operation takes a predetermined period of time depending up several factors not essentially within the purview of this invention. However, during such operation, the jig is in place to be refilled at the loading position for a succeeding machine operation.

For the greatest economy of time, that is keeping the machine operating at the highest speed of output of packaged articles thereby, it is best if the operator loading articles in the jig has a fully loaded jig for placement of articles in the packaging position immediately after the previously packaged articles are ejected or otherwise removed from the machine. Further, it is most economical of labor if jig loading time and packaging operation time be substantially the same; and the present invention affords such desideratum as a broad object hereof.

Presently used differential pressure operated skin-packaging means have a pressure bed upon which the packaging operation is effected. Such beds are commonly termed vacuum boxes and same are partially exhausted of air with articles in place on an air permeable bottom back sheet and with a plastic upper skin juxtaposed thereover. Vertically movable clamps are employed to hold at least the peripheral edges of the materials in engagement with each other and with corresponding edges of the vacuum box. These clamps are removed for unloading the packaged articles and reloading the articles and materials for a succeeding packaging operation. If an operator be required to manually place a bottom back and the articles in proper position at this time, it is obvious that the machine output capability is reduced by the amount of such placement time. Hence, essentially ultimate machine output capacity is unattainable.

Accordingly, a broad object of the present invention is to provide a high speed operational loading fixture for a skin-packaging machine, or the like.

Another broad object of the invention is to provide a high volume production method of skin-packaging articles.

A further object of the invention is to provide a loading fixture for feeding many of a kind and/or different kinds, and/or shapes, and/or sizes of articles into a skin-packaging machine.

A still further object is to provide a loading fixture in-

2 cluding releasably secured jig devices for providing the functions of the preceding objects.

The foregoing and other objects and advantages of the present invention will be either obvious or pointed out in the following specification and claims read in view of the accompanying drawings, in which:

FIGURE 1 is a front elevational view of a skin-packaging machine including the present invention;

FIG. 2 is an elevational view looking toward the left side of FIG. 1;

FIG. 3 is a partial plan view indicated by lines 3—3 of FIG. 2;

FIG. 4 is an enlarged side view of the invention;

FIG. 5 is an enlarged sectional view taken substantially on lines 5—5 of FIG. 3;

FIG. 6 is a plan view of the loading fixture frame and jig;

FIG. 7 is a plan view of the top portion of the machine normally below the frame and jig of FIG. 6 when articles are to be placed therein; and FIG. 8 is a partial plan view of a jig forming a template and showing articles in repose therein.

In carrying out a skin-packaging operation by prior known machines, for example, as well as with the present machine, the articles remain in the packaging position for a predetermined period of time. Such time may be only several seconds, or it may be as long as three or four minutes, depending upon the nature of articles and packaging materials used. If such time is one hundred seconds, for example only, and loading of articles by known means in situ requires another one hundred seconds, the machine may be considered as producing only about fifty percent of the optimum capacity thereof. In comparison, if loading of articles requires only three seconds, the production capacity attained will be about ninety-seven percent.

Because multiple packaged articles are slit apart after packaging, the placement of same precisely for packaging is of a high degree of importance. Some presently packaged articles are inserted in pierced blanks, and the blanks are left in the package adding bulk and weight thereto, wherewithal strength when such is desirable in a package. When additional strength is not needed, and bulk and weight is undesirable, it is desirable that such jig and template functions be accomplished with the present invention.

Referring now to the drawings, and first to FIGS. 1, 2 and 3, a skin-packaging machine 10 is is shown in front and side elevational views and a partial plan view showing a machine loading fixture and feed mechanism 12. The particular details of construction of the skin-packaging machine 10 are not specifically limited to the details of the machine to be described hereinbelow, by way of example only, and are not to be construed in a limiting sense. The loading fixture 12 cooperable with a vacuum box 15 are important attributes of the invention and such will be described in detail later in the specification.

The machine 10 includes a base 14 which can enclose suitable air-compressing apparatus, not shown, as well as automatic control means for supplying both pressurized fluid and exhausting the vacuum box 15, FIG. 3, for ececting the skin-packaging operation. A thermoplastic film is supplied from a roll 16 and is arranged to be drawn across the top of the vacuum box 15 after articles to be packaged are placed on top of the vacuum box upon a perforated or air-pervious backing piece of material, not shown in these figures, but to be pointed out hereinbelow.

With the backing material, articles to be packaged and a portion of thermoplastic film over the top of the vacuum box 15, a suitable peripheral frame, not shown, may be brought down around the periphery of the vacuum box to secure the film against the upper surface of the backing sheet with the articles therebetween. Thereafter, a vacuum is drawn through perforations in the top of the air-pervious material and become laminated thereof the vacuum box 15 which causes air interspaced between the film and backing member to be withdrawn. The film is previously heated by a heater 18 which is positionable in known manner over the film either before or when extended over articles to be packaged for a predetermined time to heat the film to render the same adhesive whereby it will adhere to at least the backing sheet with to form a package for an article or group of articles.

A fan 19 is arranged to blast air downwardly into impingement with the film over the packaged articles while still on the surface of the vacuum box 15 for causing the thermoplastic film to cool to complete that stage of packaging accomplished on the surface of the vacuum box 15. The fan 19 is mounted on a carriage 19a which may be positioned suitably laterally and vertically to best effect the cooling function at the conclusion of a packaging operation.

As pointed out briefly hereinabove, it is desirable in many operations of a skin-packaging machine to package several articles at a time in a panel of articles and thereafter slit same into individual articles or groups of articles. The mechanism for accomplishing such function will be described more in detail hereinbelow.

In the present invention, a front panel 19 of the base 14 is adapted to support a housing 20 which in turn supports the article loading and feeding mechanism 12. The housing 20 is provided with a panel board 21, FIG. 1, on which suitable gauges and switches are positioned so that an operator can control the different functions of the machine and also be apprised by gauges as to the functioning thereof in known manner.

Referring to details of construction shown in FIGS. 3 and 4, the face plate 19 supports a pair of hydraulic or pneumatic motors 24 adjacent the sides of the housing 20. The motors 24 are suitably connected by pressure tubes 25 to a source of fluid under pressure or vacuum, if desired, or atmospheric pressure for raising and lowering a pair of shafts 26 secured and suitably journaled for axial movement in pipes 28. Application of pressurized fluid to the bottom of a motor 24 through the tube 25 will drive a piston, not shown, within the motor 24 upwardly to raise the shaft 26 a predetermined distance that may be determined by the length of stroke of the piston within the motor 24 between stops therein to drive a rack portion 30 of the rod 26 up and down to raise a plate 32 attached to the tops of each rack a predetermined distance. Machine screws 33 may be threaded into the tops of the racks for forming a secure driving connection for moving the plates 32 upwardly from the solid line position shown to the dotted line position 32a, FIG. 4.

Referring to FIG. 5, the upper ends of the pipes 28 are each provided with a weld bracket 34 in turn secured to the face 19 of the base 14 as by welding or bolts. Each bracket is the same, but arranged opposite hand on the pipes 28; and only one will be described in detail. Prior to connection with the housing 14, a hole 35 is drilled through the bracket 34 and the wall of the pipe 28 to receive a pressed-in bearing 36. A hole 38 is drilled through the opposite wall of the pipe 28 to receive a shaft 40 freely therethrough, which saft in turn is journaled at its end in the bearing 36. The shaft 40 is connected to a spur gear 42 by a suitable pin 43.

The shaft 40 connects to an identical pinion 42 at the other side of the machine, which in turn is connected to the other rack 30 at the other side of the machine driven by the other motor 24 through shaft 26. The spur gears 42 are positioned and locked to the shaft 40 with the plates 32 in a first position, for example, the position shown in FIG. 5. Accordingly, upward movement of one-stroke motor 24 will be augmented by and in an identical manner implicated by the other motor 24 and the two plates 32 will be constrained to operate uniformly and in correspondence in their upward and downward movements, to hereinafter more fully described. Accordingly, the fluid motors 24 can be operated with air through suitable control valves and one of the plates 32 will not operate out of horizontally cooperable and uniform relationship with other of the plates 32.

Each of the plates 32 is secured at the inner edge as by welding to channel bars 45 in such manner that the channels 45 will be parallel to each other and extend horizontally and suitably spaced adjacent the sides of the loading mechanism and the vacuum box 15. Each of the channels 45 have rails 46 on their upper surfaces secured as by plug welding at spaced points 47 for example. These rails are likewise parallel and horizontal. The channels 45 are further connected at their ends by channels 48 to form a rectangular frame and provide strength for the rails 46. The loading mechanism 12 is provided with at least three, and as shown four, flanged wheels 50 journaled to the ends 51 of depending plates 52 in turn secured as by welding to side channels 54 near the four corners of the carriage frame of the loading mechanism 12.

As shown in FIG. 7, the side channels 54 are substantially identical and have their webs arranged inwardly. The channels 54 are mitered and welded at their ends to two identical flanges 56 having their webs arranged inwardly. Each corner is provided with a lower horizontally extending gusset 58 to support a jig 60 at its corners. The jig 60 is adapted for receiving articles and providing a template for articles to be placed in the skin-packaging position. The jig 60 may be of a suitable thickness of plywood, for example one-fourth of an inch thick to three-fourths of an inch thick, or other material having suitable rigidity and preferably light weight. The jig 60, FIG. 7, is provided with suitably sized and shaped perforations 62 shown as being rectangles and comprising twelve in number for packaging a dozen similar or identical articles at a time.

The lower frame channel 56, FIG. 7, carries a handle 64 secured to brackets 65 that in turn are welded to the channel 56. The handle 64 is used for pushing the frame inwardly and pulling it outwardly from the skin-packaging position within the packaging machine. The channel 56, attached to the handle 64, is provided with five cardboard pushing fingers in the form of depending tabs 66, of which there may be more or less than five as desired, which engage a rear edge of a bottom cardboard. The tabs 66 pass freely along grooves 68 in a top plate 70 of a loading station 12 of the packaging machine. The top plate 70 is secured at its sides to side plates 74 and an end plate 75 which have edges 74a and 75a that extend slightly above the top surface 70 to guide the placement of the air permeable cardboard 78 upon the surface 68. Spacers 79, FIGS. 4 and 6, are provided adjacent the inside edge of the end plate 75 so that the ends of lugs 66 on the bottom of the channel 56 or extension fingers 80 mounted on the lugs 66 may overreach the end of the cardboard 78 to push the same into the machine after articles are placed thereon at the loading station.

*Path of travel of the carriage*

Referring again to FIG. 4, the carriage 12 is shown in full lines over the vacuum box 15 and the cardboard 78 is shown as having been pushed by fingers 80 to substantially match and overlie the transverse dimensions of the top of the vacuum box 15. As more clearly shown in FIG. 3, the transverse dimension of the vacuum box 15 is also substantially matched by the span of the bottom piece of cardboard 78. It is also to be noted that the finger 80 is in engagement with a right-hand edge 15a of the vacuum box 15 thereby stopping the motion of the carriage 12 in the position shown. Of course, the carriage can be stopped in other positions as desired; and certain machines may require overhang of packaging material around the vacuum box for clamping purposes.

With the carriage 12 at the full line position shown in the packaging position in the machine, a switch 82 is engaged by the leading wheel 50 shown at the left-hand side of FIG. 4. The switch 52 may comprise a valve or operate a solenoid valve, not shown, to supply fluid under pressure through the tube 25 to the stroke motor 24 to drive the rod 26 and rack 30 upwardly. As explained above, the other stroke motor 24 is also supplied with fluid under pressure at the same time and it also will drive its corresponding rod 26 upward. The spur gears 42 will interlock and correlate the stroke motors functions so that both side drive plates 32 will raise the channels 45 and rails 46 to thereby raise the top surface of the carriage to the broken line position 12a. In this position, the bottom of the carriage will clear the articles in repose upon the bottom sheet 78. The operator will pull on the handle 64 to draw the carriage 12 to the broken line position 12b.

In the broken line position 12b, it is noticed that the right-hand wheel (shown in the dotted line position 50) will engage a switch 84 in the raised dotted line position 84a. The switch 84 may be adapted to break a holding circuit for the motors 24 control valve, not shown, controlling the supply of fluid in the tube 25. Such valve may either vent the tube 25 to atmosphere in the case air is used as the fluid, or to return oil, or the like, to a sump. Inasmuch as these machines have a source of sub-atmospheric-pressure air, it may be desirable to connect tube 25 through suitable valve means to the vacuum to have atmospheric pressure assistance in lowering the carriage 12 to the loading position shown in FIG. 2. The switch 84 is secured to the channel 45 to be raised and lowered therewith. When the carriage in the broken line position 12b is lowered, the fingers 80 will descend into grooves 68 in the top surface 70 and between the spacers 79 for holding the edge of the cardboard 78 away from the inside surface of the end plate 75 for the described purpose of pushing the backing cardboard 78 into the skin-packaging machine.

Operation

With the carriage 12 in the position shown, FIG. 1, and it being desired to skin package smoking pipes, for example, such as shown in FIG. 8, in an assortment of substantially similarly sized pipes, but different configurations of same, a jig 85 is inserted between channel members 54 and 56 and into engagement with the gussets 58 for supporting same. The jigs are preferably snugly sized, but releasably secured in the frame for ready replacement of different jigs. The jigs further define a template for the later slitting operations in the form of rectangularly defined areas along vertical lines 86 and horizontal lines 87. It is to be noted that certain cut-out portions 88 may be substantially the same although they receive slightly differently shaped pipe. The cut-out portion 90 is differently shaped to receive only a single shape of pipe and this is desirable so that a given number of a given kind of pipes may be included in a given packaging run of same.

In keeping with the above teaching, it is also convenient in practicing this invention to provide unassembled assemblies and packaging same in either a convenient arrangement to save space, or in aligned or relatively associated arrangement to indicate the steps of assembly of the same. This is particularly advantageous where there may be several similarly sized parts, but which may have different purposes and possibly different thread sizes, or the like, or be made of different materials to provide for corrosion resistance. The present machine and method facilitate ready assembly of packaged articles by removing them from a package one at a time and in a prescribed order of removal that may be printed upon the packing card.

With the carriage in the position shown in FIG. 2, the several articles are placed in their respective positions provided by the jig 60 and the carriage is pushed by means of the handle 64 in the position shown in FIG. 4 wherein it is stopped by the fingers 80. The switch 82 will be energized simultaneously with stopping of the carriage 12, and the carriage 12 will be raised thus leaving articles 92 to be packaged in repose on the cardboard 78 on the surface of the vacuum box 15. In raised position, the carriage 12 can be moved to position 12b and the automatic sequence of operation for lowering same, explained above, will occur. Simultaneously with operation of the switch 84, mechanism can be brought into play either by the switch 84 or other suitable means, not shown, to cause the top plastic film to be drawn over the articles 92 and automatic steps in clamping heating, vacuum forming, cooling and ejecting the articles for slitting or storage or other desired uses placed into operation.

With the carriage 12 returned to the position shown in FIG. 2, the reloading operation of the jig 60 can proceed. As pointed out above, it is preferable that the time of loading of the jig be as close to the same time as operation of the automatic skin-packaging function as possible. If not possible, it is preferred that the time of loading of articles in the position of FIG. 2 be somewhat less, rather than somewhat longer than, this time of automatic or sequentially stepped operation.

To enable the device to accommodate carriage mechanism 12 and vacuum boxes 15 of wider dimensions, and to provide support for heavy articles or flexible bottom sheets 78, an extension 95 is provided adjacent the surface 70, and in FIG. 6 is shown in alignment therewith and adjacent the edge of the vacuum box 15. The extension has grooves 68a aligned with grooves 68 of the surface 70. Such device is necessary when clamping means, not shown, require space between the edge of the vacuum box 15 and the facing edge 96 of the top surface 70. As shown in FIG. 4, the extension 95 is in its extended position and moves around a pivot 97 under influence of the movement of an end yoke 98 attached to a rod 99 moved by a stroke motor 100 pivotally mounted on a bracket 100a on the bottom of the support surface 70. When in use, this stroke motor may be adapted to operate when inward movement of the carriage 12 is initiated by movement of the handle of the switch 84a to the full line position shown in FIG. 4. The switch can control a solenoid operating a valve for controlling the operation of the stroke motor 100 to move the rod 99 toward the right to rotate a crank arm 101 clockwise to move the extension 95 to the horizontal position shown, FIG. 4. When the rolls 50 are in the dotted line position shown at the right-hand end 12b of the course of travel thereof, a switch handle of the switch in position 84a will be moved to the dotted line position to cause reverse operation of the stroke motor 100 and thence counterclockwise movement of the extension 95.

The extension 95 also has use where the bottom backing packaging members or cardboard 78 are thin and flexible. For this additional reason, the surface 70 is thirty or forty thousandths of an inch above the upper surface of the extension 95, which surface in turn is thirty or forty thuosandths of an inch higher than the upper surface of the vacuum box 15.

For a special use and purpose of this invention, the operation mentioned briefly above of packaging unassembled parts of assemblies, it is desirable that the several jigs 60 be readily interchangeable so that substantially more than a dozen or a few dozen different parts may be placed properly in jig cut-out portons such as 62, 88 and 90, or the like. With such feature, a series of several jigs may be used in sequence to handle a large number of parts in properly placed subassemblies prior to packaging, and the entire skin-packaged cards, articles and thermoplastic skins comprise of themselves a component of a complete assembly. Such assemblies need not of necessity have template forming locations such as defined by lines 86 and 87, FIG. 8, but may be aligned in a proper sequence for ultimate assembly at a remote point.

While I have shown and described in detail a presently preferred embodiment of a machine and a method for skin-packaging articles, obviously modifications and other uses of the invention will occur to others working in the art. Accordingly, I desire not to be limited in my invention only to the specific mechanism and method described, but by the scope of the following claims.

I claim:

1. A loading fixture for placing articles having stability in repose on a substantially horizontal surface for packaging the articles in a skin-packaging machine, said fixture comprising forming a frame, means for guiding said frame substantially horizontally in two planes spaced apart vertically at least a distance to clear the maximum height of an article to be packaged, means for moving said frame upward from the lower of said planes to the upper of said planes, and jig means mounted on said frame for providing lateral support for said articles while same are being placed for repose in said machine.

2. The fixture of claim 1, said guiding means providing a predetermined reciprocating path of travel of said frame into the packaging machine in the lower of said planes and out of the machine in the upper of said planes.

3. The fixture of claim 2, and means for rendering said moving means for said frame operable at the point of reversal of movement of said frame in said path of travel.

4. The fixture of claim 3, and abutment means for stopping the horizontal movement of said frame at the point of reversal of movement thereof.

5. The fixture of claim 1, said jig means further providing template means for said articles confining the repose of same to at least one predetermined position.

6. The fixture of claim 5, and means for releasably securing said frame and jig means together.

7. The fixture of claim 6, said jig means including a plurality of jigs, at least some of said jigs having differently sized and shaped templates than other of said jigs.

8. The fixture of claim 7, each of said jigs providing said template means with a predetermined pattern defining the sealed periphery of a packaged article.

9. The fixture of claim 7, said pattern having substantially rectangular constituent portions.

10. The fixture of claim 7, at least one of said templates being shaped differently than another of said templates in at least one of said jigs.

11. A loading fixture for placing articles having gravitational stability on a substantially horizontal surface for packaging the articles in a skin-packaging machine, said fixture comprising means forming a frame, means for guiding said frame substantially horizontally in two substantially parallel planes spaced apart at least a distance greater than the maximum thickness of an article to be packaged, means for moving said frame upwardly from one of said planes to the other of said planes, said jig means mounted on said frame for providing lateral support for said articles while same are being positioned in said machine.

12. In combination with a skin-packaging machine, a loading fixture for placing a plurality of articles having stability in repose on a substantially horizontal surface comprising means forming a horizontal frame, means for guiding said frame substantially horizontally in two substantially parallel upper and lower planes spaced apart at least a distance greater than the maximum thickness of an article to be packaged, means for moving said frame means upwardly from the lower of said planes to the upper of said planes, and jig means operated by said frame means for providing lateral support for said articles while same are being moved horizontally into said machine.

13. The combination of claim 12, wherein said means for moving said frame includes motor means, and control means for said motor means.

14. The combination of claim 12, wherein said control means including switch means, and a portion of said frame for operating said switch means.

15. The combination of claim 13 wherein said motor means includes a pair of spaced-apart fluid motors, and means interconnecting said motors for constraining same to a predetermined conjoint function.

16. The combination of claim 15, said motors being air-pressure actuated, and said interconnecting means being geared linkage therebetween.

17. The combination of claim 12, wherein said frame guiding means includes a pair of parallel rails, and said frame being mounted upon a plurality of rolls cooperable with said rails.

18. The combination of claim 17, wherein said means for moving said frame includes motor means adapted to move said rails with said frame thereupon.

19. The combination of claim 18, including switch means for controlling said motor means, said switch means being mounted adjacent at least one of said rails and being positioned for actuation by at least one of said rolls.

20. The combination of claim 19, wherein said switch means includes at least two spaced apart switches, one of said switches controlling said motor means for operating same in one sense, and the other of said switches controlling said motor means for operating same in another sense.

21. A high volume production skin-packaging machine for skin-packaging articles having a predetermined degree of positional stability of repose while having a substantially lower degree of positional stability when affected by inertia forces, including a movable jig means provided with relatively free-fitting article locating holes having article engaging edges for inhibiting lateral movements of the articles beyond predetermined limits of movement, whereby the articles may be placed in the locating holes at a loading position upon a substantially flat supporting surface below the jig means, means for moving the jig means relatively quickly with the articles therein over the flat surface into the skin-packaging machine, means for stopping the jig means and articles in a position in the skin-packaging machine for skin-packaging the articles, means for raising the jig means vertically to remove the jig means from the stopped articles, means for moving the jig over and away from the articles, whereby the skin-packaging operation for the articles is performed with the jig means removed from the articles.

References Cited by the Examiner

UNITED STATES PATENTS

| | | | |
|---|---|---|---|
| Re. 25,466 | 10/1963 | Kostur | 53—112 |
| 3,103,774 | 9/1963 | Wall | 53—393 |

FOREIGN PATENTS 908,269   10/1962   Great Britain.

TRAVIS S. McGEHEE, *Primary Examiner.*